United States Patent
Wang et al.

(10) Patent No.: US 9,213,634 B2
(45) Date of Patent: Dec. 15, 2015

(54) EFFICIENT REUSE OF SEGMENTS IN NONOVERWRITE STORAGE SYSTEMS

(71) Applicant: Apple Inc., Cupertino, CA (US)

(72) Inventors: Wenguang Wang, Santa Clara, CA (US); John Garvey, Victoria (CA); Richard Paul Spillane, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 14/088,265

(22) Filed: Nov. 22, 2013

(65) Prior Publication Data

US 2015/0149692 A1    May 28, 2015

(51) Int. Cl.
| | |
|---|---|
| *G06F 12/02* | (2006.01) |
| *G06F 3/06* | (2006.01) |
| *G06F 11/20* | (2006.01) |
| *G06F 11/14* | (2006.01) |

(52) U.S. Cl.
CPC .............. *G06F 12/0246* (2013.01); *G06F 3/06* (2013.01); *G06F 3/0608* (2013.01); *G06F 11/14* (2013.01); *G06F 11/2082* (2013.01); *G06F 12/0253* (2013.01); *G06F 2212/7205* (2013.01)

(58) Field of Classification Search
CPC ............ G06F 12/0246; G06F 12/0253; G06F 11/2082; G06F 11/14; G06F 3/0608; G06F 3/06
See application file for complete search history.

(56) References Cited

U.S. PATENT DOCUMENTS

| | | | |
|---|---|---|---|
| 6,151,685 A | 11/2000 | Li et al. | |
| 6,321,239 B1 | 11/2001 | Shackelford | |
| 6,336,164 B1 | 1/2002 | Gerdt et al. | |
| 6,535,949 B1* | 3/2003 | Parker .................... | G06F 3/0616 707/999.202 |
| 7,293,154 B1* | 11/2007 | Karr ...................... | G06F 11/2082 711/202 |
| 2008/0168213 A1* | 7/2008 | Kim .................... | G06F 12/0246 711/103 |
| 2011/0035548 A1* | 2/2011 | Kimmel .................. | G06F 3/061 711/114 |
| 2011/0138105 A1* | 6/2011 | Franceschini ....... | G06F 12/0246 711/103 |
| 2012/0072683 A1* | 3/2012 | Iliadis ................. | G06F 12/0246 711/159 |
| 2012/0110247 A1 | 5/2012 | Eleftheriou et al. | |
| 2012/0240012 A1* | 9/2012 | Weathers ............ | G06F 11/1072 714/773 |
| 2013/0060989 A1 | 3/2013 | Aune | |
| 2014/0013032 A1* | 1/2014 | Min .................... | G06F 12/0246 711/103 |

* cited by examiner

*Primary Examiner* — Hiep Nguyen
(74) *Attorney, Agent, or Firm* — Downey Brand LLP

(57) ABSTRACT

A non-overwrite storage system, such as a log-structured file system, that includes a non-volatile storage having multiple storage segments, a volatile storage having an unsafe free segments list (UFSL), and a controller for managing storage resources of the non-volatile storage. The controller can be configured to copy page data from used segment(s) of the non-volatile storage, write the copied page data to free segment(s) of the non-volatile storage, index the UFSL with indications of the used segment(s), and thereafter prevent reuse of the used segment(s) while the indications of the used segment(s) remain indexed in the UFSL. In some implementations, the non-overwrite storage system may be associated with flash storage system, and a flash controller can be configured perform a flush track cache operation to clear the indications of the used segment(s) from the UFSL, to enable reuse of segment(s) that were previously indexed to the UFSL.

20 Claims, 8 Drawing Sheets

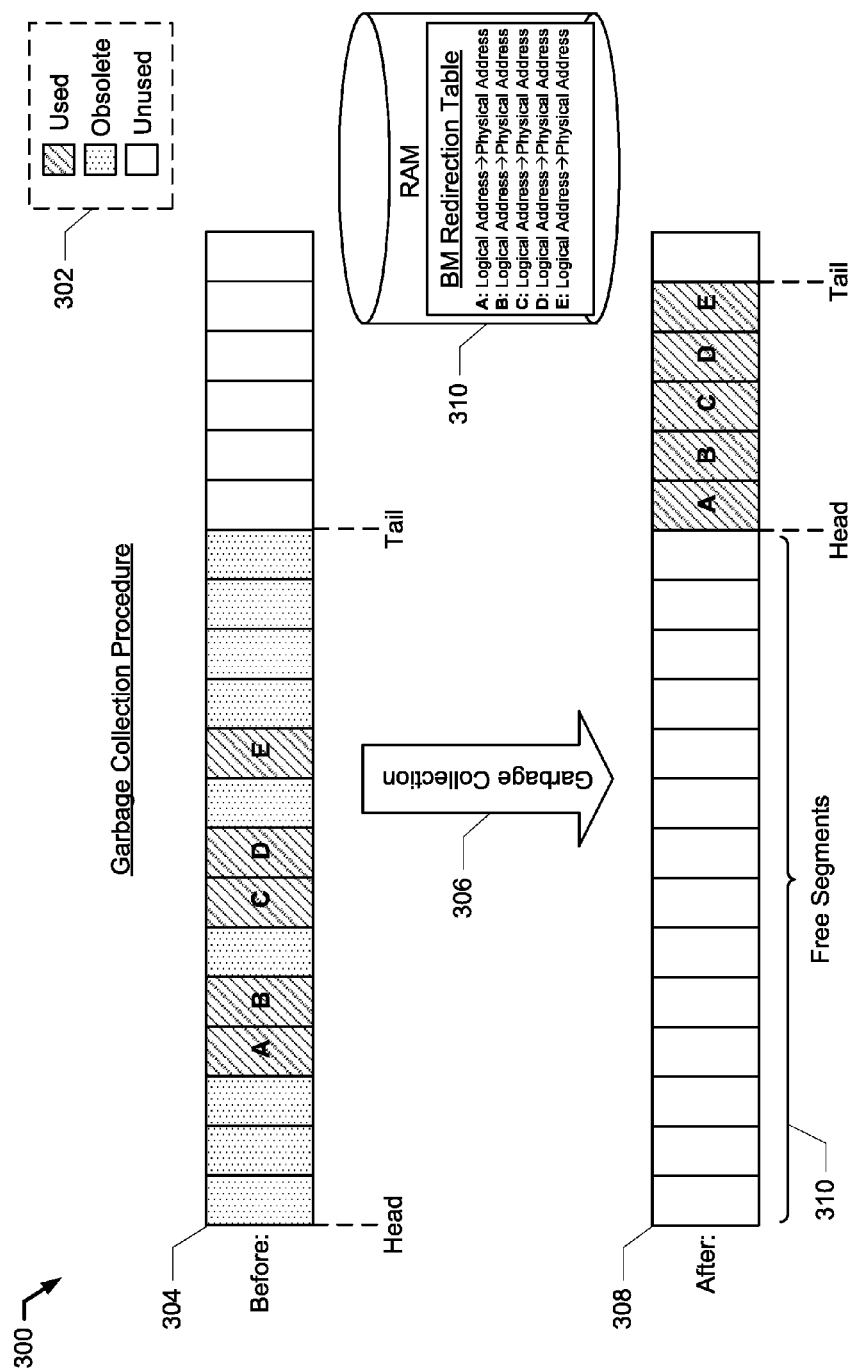

EFFICIENT REUSE OF SEGMENTS IN NONOVERWRITE STORAGE SYSTEMS

FIELD

The described embodiments generally relate to non-overwrite storage systems, and more particularly, to procedures for efficiently managing free space within a log-structured file system to improve system storage throughput.

BACKGROUND

Many modern electronic devices employ a log-structured file system (LFS) as a non-overwrite storage system to write data to a corresponding device's writable storage component(s), in a manner that provides improved storage throughput from overwrite-type storage systems of the past. Overwrite-type storage systems were previously utilized more frequently in consumer electronic devices to minimize storage space requirements, e.g., by writing new data directly to previously-used storage blocks whose data was deemed to be obsolete, as opposed to only writing new data to free storage segment blocks. However, these predecessor storage systems have many intrinsic deficiencies that negatively impact storage throughput and data resiliency, particularly in system crash scenarios.

For this reason, the use of non-overwrite storage systems in consumer electronics is on the rise. For example, solid state drives (SSDs) and other flash-based non-overwrite storage systems provide device manufacturers with an affordable, high-capacity storage option for integration within many of their consumer electronics products. Accordingly, LFS-based storage is the predominant storage mechanism employed in numerous, different types of personal computing devices in the consumer marketplace today. Some of these personal computing devices include, but are not limited to including: desktop and laptop computers, mobile phones and smartphones, tablet computers, media player devices, electronic book devices, mobile hotspot devices, cameras, video recording devices, gaming units, or the like.

As one example, non-overwrite flash storage systems are prevalent in mobile wireless communications devices, largely because the cost per flash storage unit is decreasing while the capacity of flash storage units continues to increase. As is generally understood, flash storage is an electronic non-volatile storage medium developed from electrically erasable programmable read-only memory (EEPROM), which can be deployed in small form-factor devices, and flash has the capability of being able to be rapidly erased and reprogrammed to improve storage system throughput. The two main types of flash storage are NAND flash and NOR flash, whose characteristics are inherent to their respective NAND and NOR transistor-based logic gates. NAND-type flash can be employed in device main storage, storage cards, universal serial bus (USB) drives, and other many other applications, for the purpose of long-term storage, temporary storage, data transfer cache, etc. By way of example, a couple of common flash-based LFSs include the Journaling Flash File System (JFFS or JFFS2) and the Yet Another Flash File System (YAFFS and YAFFS2).

Non-overwrite storage systems, such as flash, can be written to in data blocks with data pages. Data blocks are individual units of a larger storage unit that is commonly referred to as a storage segment. The basic concept behind the LFS in non-overwrite storage systems is that when block data (i.e., data pages) needs to be updated or otherwise changed, the LFS will write a new copy of the changed block data to a storage block of a free segment, remap the corresponding LFS pointers, and then erase the obsolete block data from the old storage block. Non-overwrite storage devices, e.g., flash storage devices, can employ a controller entity having a block manager, e.g., as part of the flash translation layer, to perform these functions, as well as various other dedicated non-overwrite storage system functions associated with wear leveling, data block recovery, power loss recovery, garbage collection, error correction, etc.

In response to a system crash event, it is important for the controller entity of a non-overwrite storage system to be able to return to a storage system restore point where recently written information is identifiable and still maintained in storage. In these scenarios, an LFS controller entity needs to be able to re/locate and/or re/map page data in an unencumbered manner, by not being required to perform expensive, supplemental synchronization operations to ensure that storage system pointers are always updated in anticipation of uncommon system failure events.

Accordingly, there exists a need for a solution that provides for seamless non-overwrite storage system recovery, in lieu of performing unscheduled synchronization operations, to enhance system throughput for normal LFS write operations.

SUMMARY

Apparatus and methods for a non-overwrite storage system, such as a log-structured file system (LFS), which can include a non-volatile storage having multiple storage segments, a volatile storage having an unsafe free segments list (UFSL), and a controller for managing storage resources of the non-volatile storage. In some implementations controller can be configured to copy page data from used segments of the non-volatile storage, write the copied page data to free segments of the non-volatile storage, index the UFSL with indications of the used segments, and thereafter prevent reuse of the used segments while the indications of the used segments remain indexed in the UFSL.

In some aspects, the non-overwrite storage system may be associated with flash storage system, and a flash controller that is associated with a block manager can be configured to perform a flush track cache (synchronization) operation to clear the indications of the used segments from the UFSL to enable reuse of segments that were previously indexed to the UFSL.

In another aspect of the disclosure, a procedure of managing storage resources for a LFS can include a non-overwrite storage system controller copying write block data from used segments of the LFS, writing the copied write block data to one or more free segments of the LFS, indexing an UFSL with indications of the used segments after copying the write block data, and thereafter, preventing reuse of the used segments while the indications of the used segments are indexed in the UFSL.

In an aspect, the indications of the used segments from the UFSL can be cleared in response to performing a scheduled synchronization operation, and then one or more of the used segments that was previously indexed to the UFSL can be reused.

In some aspects, the non-overwrite storage system controller can reuse one of the used segments which were previously indexed to the UFSL by writing new write block data to one or more of the used segments which was previously indexed to the UFSL, and updating a block manager via the non-overwrite storage system controller with a storage location for the new write block data.

In various implementations, performing the scheduled synchronization operation can include mapping one or more logical storage addresses associated with the copied write block data to one or more physical storage addresses where the copied write block data is stored after writing the copied write block data to free segments of the LFS.

In other aspects, a procedure carried out by the non-overwrite storage system controller may include receiving new write block data after indexing the UFSL, consulting the UFSL to determine which segments of the LFS are indexed in the UFSL as unavailable segments, identifying one or more free segments of the LFS that are not indexed in the UFSL as unavailable segments (as these segments are available free segments), and then writing the received new write block data to the identified one or more free segments of the LFS.

In accordance with another aspect of the disclosure a non-overwrite storage system controller can carry out a procedure of writing page data in a non-overwrite storage system, and this procedure may include determining a number of required segments for writing the page data in the non-overwrite storage system, consulting an UFSL to identify which free segments of the non-overwrite storage system should not be written to, determining whether sufficient free segments are available for writing the page data in the non-overwrite storage system, and in response to determining that sufficient free segments are available, writing the page data to data blocks of one or more free segments of the non-overwrite storage system.

In one aspect, determining whether sufficient free segments are available, can include comparing the number of required segments for writing the page data in the non-overwrite storage system to a number of available free segments in the non-overwrite storage system (excluding free segments identified in the UFSL) and then determining whether the number of free segments in the non-overwrite storage system (excluding free segments identified in the UFSL) is equal to or exceeds the number of required segments for writing the page data in the non-overwrite storage system.

In another aspect, in response to determining that sufficient free segments are not available for writing the page data in the non-overwrite storage system, the procedure carried out by the a non-overwrite storage system controller may include performing a synchronization operation to clear the UFSL, and then determining whether sufficient free segments are available for writing the page data in the non-overwrite storage system after performing the synchronization operation.

In some configurations, the non-overwrite storage system can be a flash storage system, and the synchronization operation can be a flush track cache operation that is scheduled to occur on a periodic basis to update a block manager of the flash storage system with current storage location information.

In another aspect of the disclosure, in response to performing the synchronization operation and determining that sufficient free segments are available for writing the page data in the non-overwrite storage system, the procedure can include writing the page data to data blocks of one or more free segments of the non-overwrite storage system (these segments are not indexed in the UFSL).

In yet another aspect, in response to performing the synchronization operation and determining that sufficient free segments are available for writing the page data in the non-overwrite storage system, the procedure can further include writing the page data to data blocks of one or more free segments which was previously identified in the UFSL.

In some scenarios, the procedure carried out by the non-overwrite storage system controller can include performing a garbage collection operation to free up one or more segments of the non-overwrite storage system in response to performing the synchronization operation and determining that sufficient free segments are not available for writing the page data in the non-overwrite storage system, determining whether sufficient free segments are available for writing the page data in the non-overwrite storage system after performing the garbage collection operation, and then in response to performing the garbage collection operation and determining that sufficient free segments are available for writing the page data in the non-overwrite storage system, writing the page data to data blocks of one or more free segments of the non-overwrite storage system.

In yet another aspect, a non-overwrite storage system can include a non-volatile storage component having numerous storage segments, each storage segment having a specified number of storage blocks for writing page data, or block data, thereto, a volatile storage component having a UFSL, and a controller coupled to the non-volatile storage component and to the volatile storage component, where the controller can be configured to perform one or more storage resource management procedures of the disclosure.

In one implementation, the controller of the non-overwrite storage system can be configured to carry out a storage resource management procedure to copy page data from one or more used segments of the storage segments, write the copied page data to one or more free segments of the storage segments, index the UFSL with indications of the one or more used segments after copying the page data, and then, prevent reuse of the one or more used segments while the indications of the one or more used segments are indexed in the UFSL.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

FIG. 3 shows a block diagram depicting a non-overwrite storage system garbage collection procedure that is utilized for freeing up previously used storage segments for future write operations, in accordance with some embodiments.

DETAILED DESCRIPTION

Representative examples for efficiently managing the reuse of storage segment resources of non-overwrite storage systems are described within this section. In some implementations, a non-volatile storage system (e.g., a flash-based storage system) that employs a log-structured file system (LFS) may be coupled to an electronic computing device, e.g., as part of the electronic computing device's manufacturer-provided storage system, or alternatively, as part of an add-on (e.g., plug-in) storage system for the electronic computing device. In either scenario, the storage system should be configured to withstand unexpected system crash events in a manner that prevents storage system data loss, while at the same time maximizing storage system throughput. This disclosure describes example storage systems that are capable of achieving these objectives, as well as various other advantages as further described herein.

The provided examples are intended to add context to, and to aid in the understanding of, the cumulative subject matter of the disclosure. However, it should be apparent that the embodiments discussed in this disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure. Further, references are made in this section to the accompanying drawings, which form a part of the disclosure and in which are shown, by way of illustration, various implementations corresponding to the described embodiments herein. Although the embodiments of this disclosure are described and depicted in sufficient detail to enable one having ordinary skill in the art to practice the described subject matter, it should be understood that these examples are not to be construed as being overly-limiting or all-inclusive.

Figure 1:
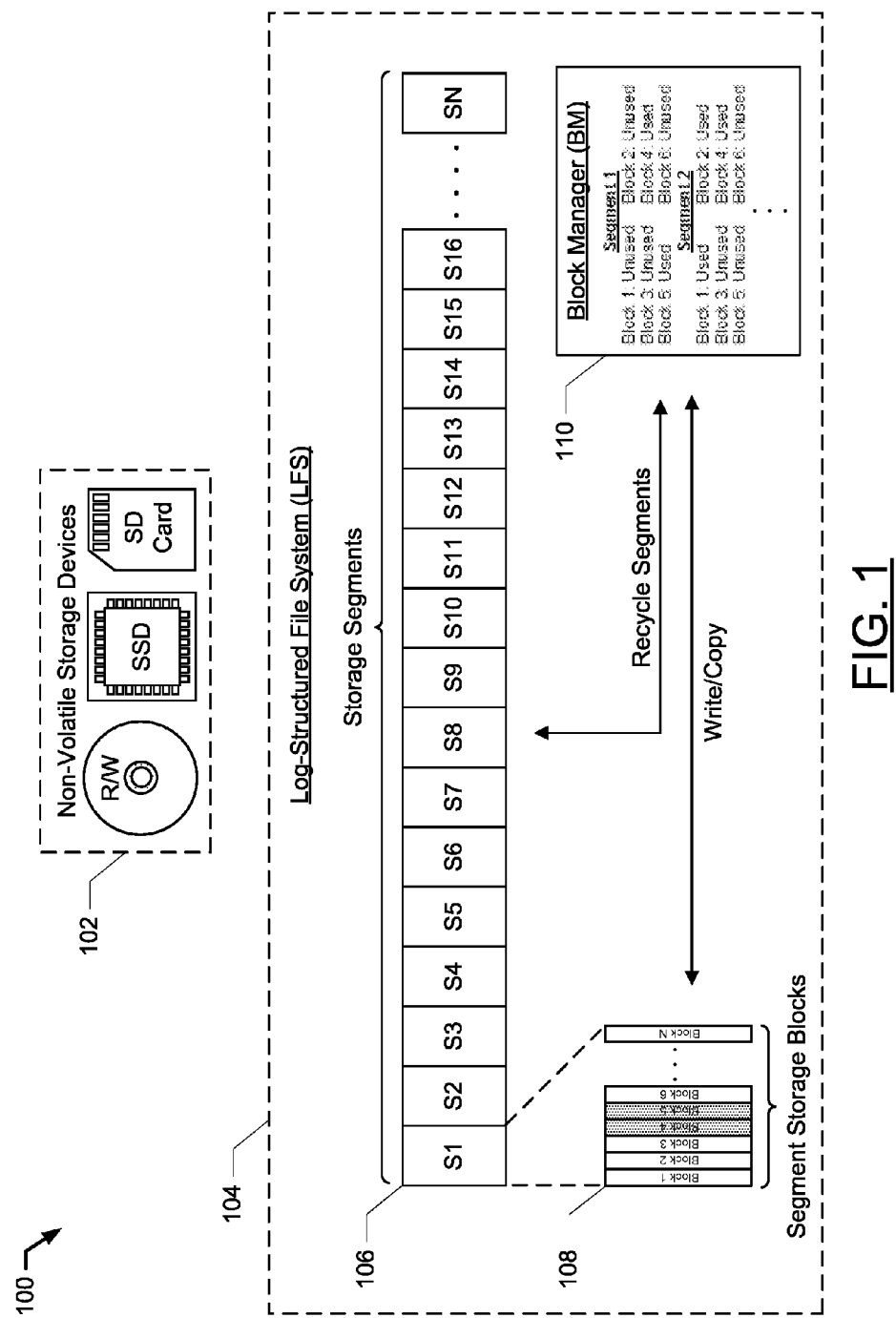
FIG. 1 shows a diagram depicting various non-volatile storage devices employing a non-overwrite storage system, such as a log-structured file system (LFS), in accordance with various embodiments of the disclosure.

FIG. 1 shows a diagram 100 depicting various non-volatile storage devices 102 that are each capable of employing a non-overwrite storage system, such as a LFS 104, in accordance with various embodiments of the disclosure. The non-volatile storage devices 102 may include, but are not limited to including, a compact disc having read/write functionality, a solid state drive (e.g., an SSD composed of NAND-based flash), a secure digital (SD) storage card (e.g., an SD flash card), or the like. In accordance with some embodiments, any of the non-volatile storage devices 102 may be coupled to, or otherwise embedded within, an electronic computing device (e.g., the apparatus 200 depicted in FIG. 2), such as: a desktop or laptop computer, a mobile phone or smartphone, a tablet computer, a media player device, an electronic book device, a mobile hotspot device, a digital camera, a video recording device, a portable gaming device or a consumer premises gaming console, etc.

In various implementations, the LFS 104 storage system can be composed of numerous storage segments 106 (e.g., storage segments S1 through SN) that are respectively composed of multiple, individual segment storage blocks 108 (e.g., block 1 through block N). In this regard, each storage segment 106 of the LFS 104 can include one or more used storage blocks (e.g., storage blocks having page data written thereto), as well as one or more unused storage blocks 108 (e.g., storage blocks that are not written with any page data). For example, as depicted in FIG. 1, within storage segment S1 106, blocks 4 and 5 are depicted as used storage blocks 108 that are each written to with page data (shown by fill shading); whereas, blocks 1-3 and 6-N of storage segment S1 106 are depicted as unused storage blocks 108 that do not contain any page data.

Figure 2:
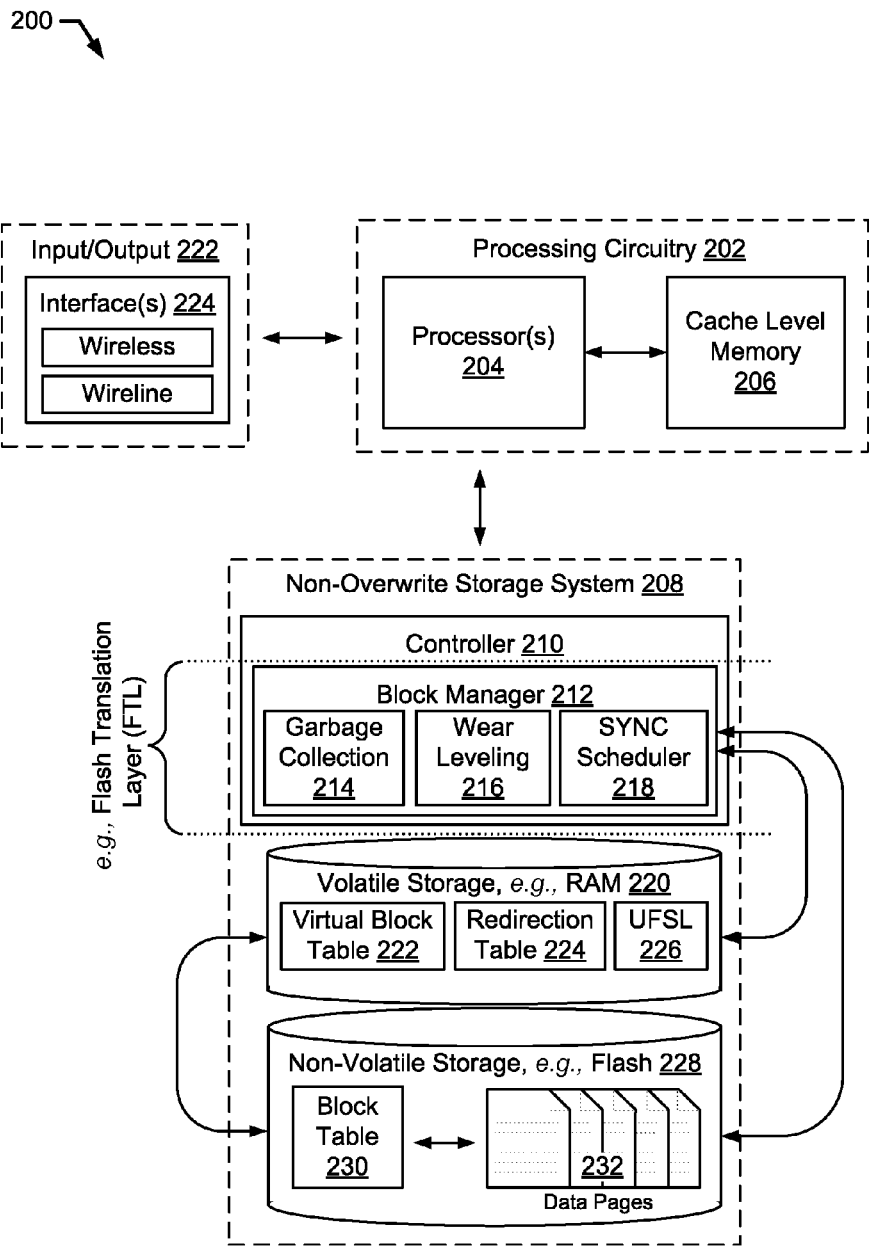
FIG. 2 shows a block diagram depicting an apparatus having a non-overwrite storage system with a controller and a block manager that can collaboratively employ an unsafe free segments list (UFSL) to improve system throughput during various storage system write operations, in accordance with implementations of the disclosure.

As will be described further herein, a non-overwrite storage system, such as the LFS 104 of FIG. 1, can include a block manager 110 component that may be part of, or in communication with, a storage controller entity (e.g., as depicted in FIG. 2). In some embodiments, the block manager 110 may be a logical entity (e.g., a software-based entity), and in other embodiments, the block manager 110 may be a physical entity (e.g., realized as hardware-based entity). Alternatively, the block manager may be a combination of a software-based entity and a hardware-based entity that can be employed as an integral part of a storage system's architecture, e.g., a part of the flash translation layer (FTL) of a flash-based storage system. As such, in some implementations, the block manager 110 can be a component of a storage system controller.

In various scenarios, the block manager 110 of the LFS 104 can be configured to manage, control, and/or perform any of the following storage system procedures: block data or page data write operations, block data or page data copy operations, storage segment recycle/recover operations (e.g., associated with garbage collection procedures or unsafe free segment clearing procedures), logical to physical address mapping operations (e.g., storage address translation), storage segment wear-leveling operations, etc. In some embodiments, this functionality may be achieved in collaboration with a storage system controller. As depicted in FIG. 1, the block manager 110 can also maintain and periodically update a block table (e.g., as depicted in FIG. 2) with the present status of each storage segment 106 and/or of each storage block 108 of a corresponding storage segment 106 within a storage system.

FIG. 2 shows a block diagram depicting an apparatus 200 having a non-overwrite storage system 208 with a controller 210 and a block manager 212 that can independently or collaboratively utilize an unsafe free segments list (UFSL) 226 to improve system throughput during various storage system write operations, in accordance with various implementations of the disclosure. As discussed above, in accordance with various embodiments, the apparatus 200 may be associated with an electronic computing device such as a personal computer, a mobile phone, a tablet computer, a media player device, a portable hotspot device, a digital camera, a video recording device, a gaming device, or the like. In this regard, in addition to including the non-overwrite storage system 208, the apparatus 200 can also include processing circuitry 202 with one or more processors 204 and cache-level memory 206, as well as one or more input/output components 222 with wireless and/or wireline communication interfaces 224, as is typical of many different types of electronic computing devices.

In some configurations, the apparatus 200 can include processing circuitry 202 that can perform at least a portion of the various non-overwrite storage system resource management operations utilizing the UFSL 226 (in conjunction with processing circuitry of the controller 210, not shown) to improve system storage throughput, e.g., in the manner described further herein with respect to FIGS. 4c-6. In this regard, the processing circuitry 202 and/or processing circuitry of the controller 210 can be configured to control performance of one or more functionalities of the apparatus 200 and the non-overwrite storage system 208, and thus can provide functionality for performing various system storage and crash recovery procedures in accordance with various embodiments, described further herein. The processing circuitry 202 may further be configured to perform data processing, application execution, and other control and management functions of the apparatus 200 according to one or more embodiments of the disclosure.

The processing circuitry 202 of the apparatus 200 and/or the controller 210 of the non-overwrite storage system 208, or portions or components thereof, may respectively include one or more chipsets, which can be configured with any number of coupled microchips thereon. Further, the processing circuitry 202 and/or the controller 210 may be configured to separately or collaboratively implement functions associated with management and/or control of various non-overwrite storage system 208 resources. For instance, in some embodiments, the controller 210 of the non-overwrite storage system 208 can employ, or collaborate with, the block manager 212 to perform procedures associated with controlling the volatile storage components, e.g., the random access memory (RAM), as well procedures associated with controlling the non-volatile storage resources, e.g., a flash storage, of the non-overwrite storage system 208.

In some implementations, the controller 210 and/or the block manager 212 can be configured to perform garbage collection procedures 214, storage wear-leveling procedures 216, synchronization scheduling procedures (e.g., periodically scheduled flush track cache operations), etc., for the non-volatile storage component 228 of the non-overwrite storage system 208. In some embodiments, the block manager 212 (which may be associated with a FTL) can be employed to perform a garbage collection procedure 214 for the non-overwrite storage system 208 to recycle, consolidate, and/or organize one or more storage segments 106, e.g., to free up previously used storage segments for future write operations. The garbage collection procedure for a LFS 104 will be described in further detail with respect to FIG. 3.

In other embodiments, the block manager 212 may be employed (e.g., via the controller 210) to perform non-volatile storage 228 wear-leveling procedures 216 to attempt to prolong the service life of erasable computer storage media, e.g., such as flash storage used in SSDs and flash drives. For instance, several common types of non-volatile storage devices 228 have individually erasable storage segments 106 and segment storage blocks 108 that can only be put through a limited number of erase cycles before becoming effectively unusable or unstable (e.g., between 3,000 to 5,000 erase cycles for some types of flash storage). In general, wear-leveling procedures attempt to work around these limitations by arranging data so that erasures and/or re-writes are evenly distributed across the storage medium. In this manner, no single storage segment 106 or segment storage block 108 should fail due to undergoing a disproportionately large number of write operations or write cycles.

In some implementations, the block manager 212 may be employed (e.g., via the controller 210) to utilize the synchronization scheduler 218 to schedule and perform various synchronization operations (e.g., periodically scheduled flush track cache operations) for the non-overwrite storage system 208 using the redirection table 224 of the volatile storage 220. For example, the block manager 212 can perform a flush track cache synchronization operation via its synchronization scheduler 218, whereby a logical address associated with a particular page data 232 in a virtual block table 222 of the volatile storage 220 is mapped to a corresponding physical address associated with the page data 232 in a block table 230 of the non-volatile storage 228, using a redirection table 224 to coordinate the address mapping. It should be understood that, in accordance with various embodiments, the virtual block table 222 and/or the block table 230, or any of their respective functionality, may be consolidated (or optionally eliminated) in either the volatile storage 200 or the non-volatile storage 228, without departing from the spirit and scope of the disclosure.

In accordance with some embodiments, a scheduled synchronization operation can also clear the UFSL 226 of indexed free segments, such that free segments which were previously deemed to be unsafe for reuse by the block manager 212 can be removed from the UFSL (the indications/identifiers of these flagged, unsafe free segments are removed from the UFSL), thereby allowing these previously unavailable free segments to be reused for future write operations. As will be described further herein, a synchronization operation effectively updates the block manager 212 by remapping the logical addresses for write blocks of these segments to their corresponding physical address, such that when a system crash event occurs, the storage location (e.g., the physical address) of corresponding page data is known and traceable by the block manager 212.

In various implementations, the processors 204 of the processing circuitry 202, as well as processors of the controller 208, may be configured and/or employed in a variety of different forms. For example, these processors may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors can be coupled to and/or configured in operative communication with each other and these components may be collectively configured to perform one or more procedures of the apparatus 300, the controller 210 and/or the block manager 212, or the non-overwrite storage system 208, as described further herein with respect to FIGS. 3-6.

In some scenarios, the processors 204 of the processing circuitry 202, as well as processors of the controller 208, can be configured to execute instructions that may be stored in the non-overwrite storage system 210 or that can be otherwise accessible to the processors in some other devices storage or device memory. As such, whether configured as, or in conjunction with, hardware or a combination of hardware and software, the processors 204 of the processing circuitry 202, as well as processors of the controller 208, may be independently or collaboratively capable of performing operations according to various implementations described herein when configured accordingly.

It should be appreciated that not all of the components, device elements, and hardware illustrated in, and described with respect to, the apparatus 200 shown in FIG. 2 may be essential to this disclosure, and thus, some of these items may be omitted, consolidated, or otherwise modified within reason without departing form the spirit and scope of the disclosure. Additionally, in some implementations, the subject matter associated with the apparatus 200 or the non-overwrite storage system 208 can be configured to include additional or substitute components, device elements, or hardware, beyond those that are depicted within FIG. 2.

FIG. 3 shows a block diagram 300 depicting a non-overwrite storage system garbage collection procedure 306 that is utilized for freeing up previously-used storage segments 310 for future write operations, in accordance with some embodiments. It should be understood that the non-overwrite storage system 208 associated with the garbage collection procedure 306 can be a LFS, e.g., such as a journaling flash file system (JFFS), including a circular-log of storage segments and corresponding storage segment blocks (not shown for clarity). The non-overwrite storage system 208 garbage collection procedure 306 is depicted at a high level in FIG. 3 to aid in the understanding of this storage segment reclamation process, whereby storage segments are recycled for future write operations.

By way of example, when a determination is made within a non-overwrite storage system 208 that not enough free segments exist to accommodate a particular write operation, the garbage collection procedure 306 may be initiated, e.g., by a controller 210 utilizing the garbage collection component 214 of the block manager 212. It should be apparent that page data written to non-volatile storage 228, e.g., flash storage, can be written to the tail of the storage area, so that segments at the head of the storage area can be reclaimed during the garbage collection procedure 306. Additionally, data within used storage segments that is deemed to be valid may be consolidated to the tail of the storage area, whereas invalid data can be erased.

Prior to initializing the garbage collection procedure 306 (See the "Before" representation), the non-volatile storage 228 of the non-overwrite storage system 208 can include a series of storage segments 304 that are identified as being either used, obsolete, or unused, e.g., indicated by their respective designation within the shading key 302. For instance, obsolete storage segments may consist of one or more storage blocks with page data that is deemed to be invalid (in various scenarios, these segment storage blocks can erased without detrimental data loss); used storage segments, A, B, C, D, and E, may consist of one or more storage blocks with page data that is deemed to be valid (these segment storage blocks should not be erased, but they can be copied and re-written), and unused storage segments that may consist of storage blocks with no page data, which are deemed to be free storage segments.

In response to initializing the garbage collection procedure 306, storage blocks with invalid page data are erased and their corresponding obsolete storage segments 308 can be reclaimed/recycled, whereas page data of storage blocks which is deemed to be valid can be copied and written to new free storage segments 308, A, B, C, D, and E, (See the "After" representation). In this manner, previously-used storage segments (A, B, C, D, and E of the "Before" representation) can also be reclaimed after their corresponding storage block page data is consolidated and written to the new storage blocks. Although, the garbage collection procedure 306 of FIG. 3 is depicted at a high level, it should be understood that the block manager 212 may be configured to employ its redirection table 310 to map the logical storage addresses associated with the page data locations in the "Before" representation to the new physical storage addresses associated with the page data locations in the "After" representations, to prevent data loss and page data address mapping inconsistencies.

Figure 4A:
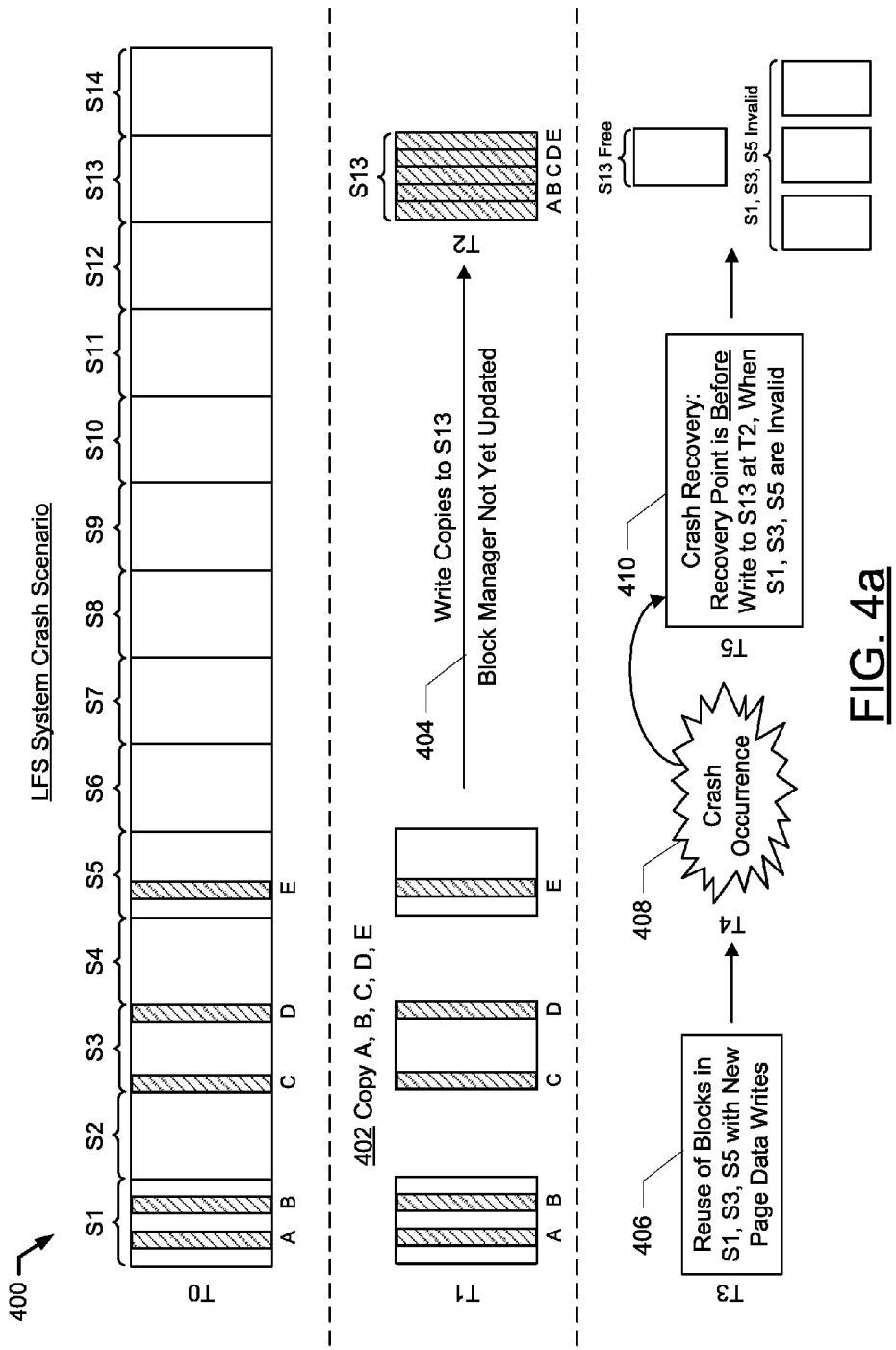
FIG. 4a shows a block diagram depicting a system crash scenario for a storage system employing a LFS, which results in a data loss, in accordance with various implementations.

FIG. 4a shows a block diagram depicting a system crash scenario 400 for a storage system employing a LFS, which results in a detrimental storage system data loss, in accordance with various implementations. Initially, at time T0 a series of storage segments, S1 through S14, exist within a non-volatile storage component 228 of the LFS. As depicted, storage segment S1 includes page data within two segment storage blocks, labeled blocks A and B, storage segment S3 includes page data within two segment storage blocks, labeled blocks C and D, and storage segment S5 includes page data within one segment storage block, labeled block E. Subsequently at time T1, page data of blocks A, B, C, D, and E, of storage segments S1, S3, and S5, are copied at operation 402. Then at operation 404 (when the block manager 212 is not yet updated with a corresponding logical to physical address mapping for the page data), the copied page data of blocks A, B, C, D, and E, can be written to storage segment S13, at time T2, such that the page data of blocks A, B, C, D, and E, is consolidated to a single storage segment, S13.

Thereafter, at time T3, the data blocks, A, B, C, D, and E, of storage segments S1, S3, and S5, can be written to with new page data, at operation 406. Next, at time T4, an unanticipated system crash event 408 may occur, causing the storage system to implement a crash recovery procedure 410, at time T5. As part of the crash recovery procedure 410, the storage system may restore the system to a recovery point that is before the write operation 404, at time T2, when the page data of blocks A, B, C, D, and E, of storage segments S1, S3, and S5 is invalid. This is particularly problematic, because the copied page data of blocks A, B, C, D, and E, of operation 402 is lost, as the recovery point occurs before the copied page data was written to the free storage segment S13 at time T2.

Figure 4B:
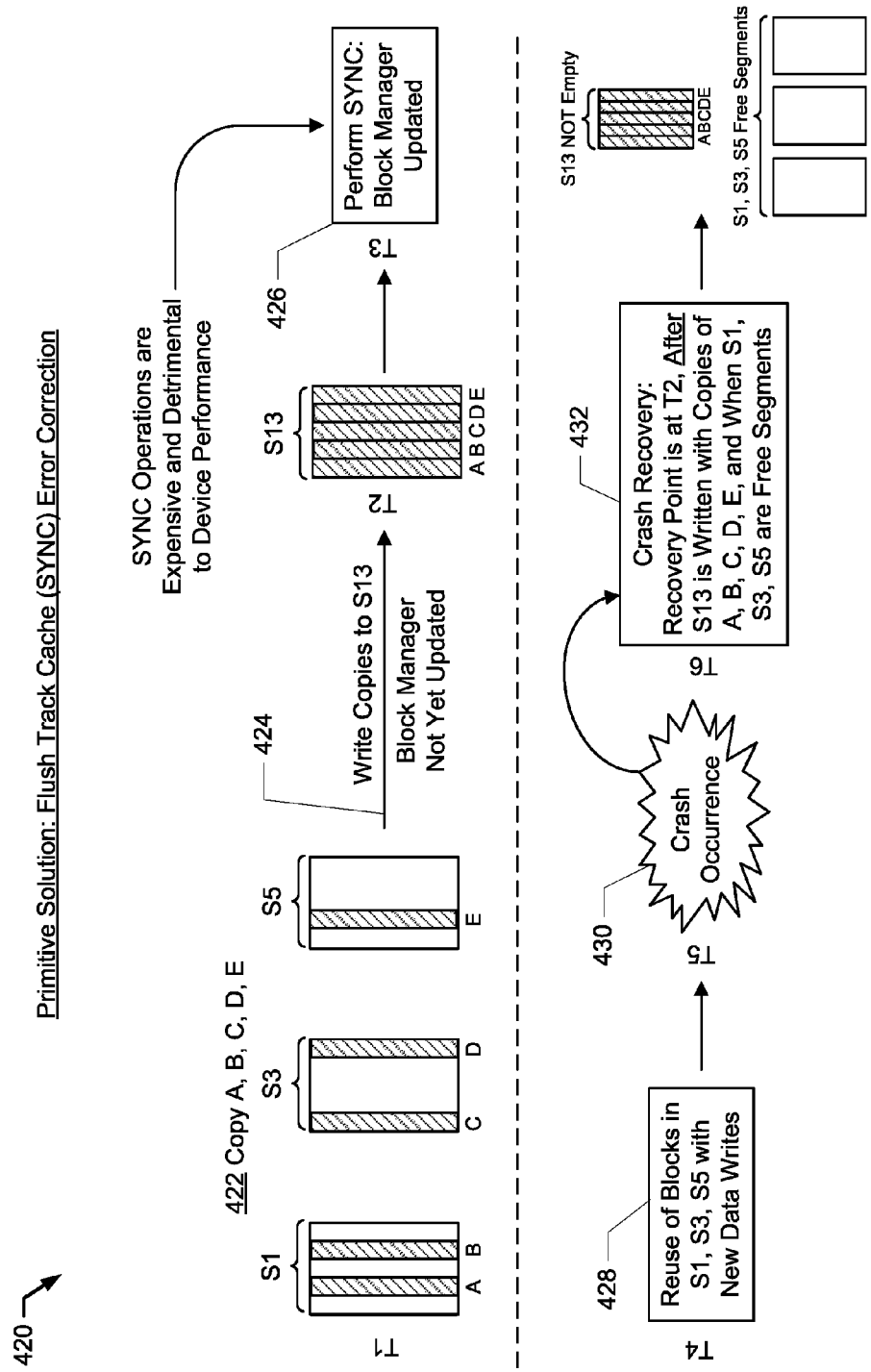
FIG. 4b shows a block diagram depicting a primitive crash recovery mechanism associated with the system crash scenario of FIG. 4a, which prevents data loss during the crash scenario but degrades storage system throughput by performing unscheduled synchronization operations, in accordance with some embodiments of the disclosure.

FIG. 4b shows a diagram depicting a primitive crash recovery mechanism 420 associated with the system crash scenario 400 of FIG. 4a, which prevents data loss during the crash scenario, but degrades storage system throughput by necessarily performing unscheduled synchronization operations, in accordance with some implementations. Following time T0 of the system crash scenario 400 of FIG. 4a, at time T1, page data of blocks A, B, C, D, and E, of storage segments S1, S3, and S5, are copied at operation 422. Then at operation 424 (when the block manager 212 is not yet updated with a corresponding logical to physical address mapping for the page data), the copied page data of blocks A, B, C, D, and E, can be written to storage segment S13, at time T2, such that the page data of blocks A, B, C, D, and E, is consolidated to a single storage segment, S13.

Immediately following the write operation 424 to storage segment S13, at time T3, a block manager 212 can issue a dynamic synchronization operation that is not associated with a periodically scheduled synchronization operation, at operation 426. This synchronization operation can update the block manager 212 with a corresponding logical to physical address mapping for the page data, such that the page data is traceable and maintained in storage. Further, this synchronization operation will effectively modify the storage system recovery point to prevent data loss during a system crash event 430. As is generally understood, synchronization operations (e.g., flush track cache operations) are expensive and detrimental to storage system performance, as synchronization operations are time-intensive operations that temporarily prevent system storage write operations during their performance. Accordingly, performing unscheduled synchronization operations to aid in system crash recovery will negatively impact storage system throughput.

Thereafter, at time T4, the data blocks, A, B, C, D, and E, of storage segments S1, S3, and S5, can be safely written to with new page data, at operation 428. Then, at time T5, an unanticipated system crash event 430 may occur, causing the storage system to implement a crash recovery procedure 432, at time T6. As part of the crash recovery procedure 432, the storage system may restore the system to a recovery point that is after the write operation 424, at time T2, when the copied page data of blocks A, B, C, D, and E, is written to storage segment S13. In this crash recovery scenario 432, the supplemental synchronization operation 426 effectively alters the system recovery point to occur after a successful write operation to storage segment S13. Accordingly, the copied page data of blocks A, B, C, D, and E, of operation 402 is not lost, as the recovery point now occurs after the copied page data was written to the free storage segment S13 at time T2.

Figure 4C:
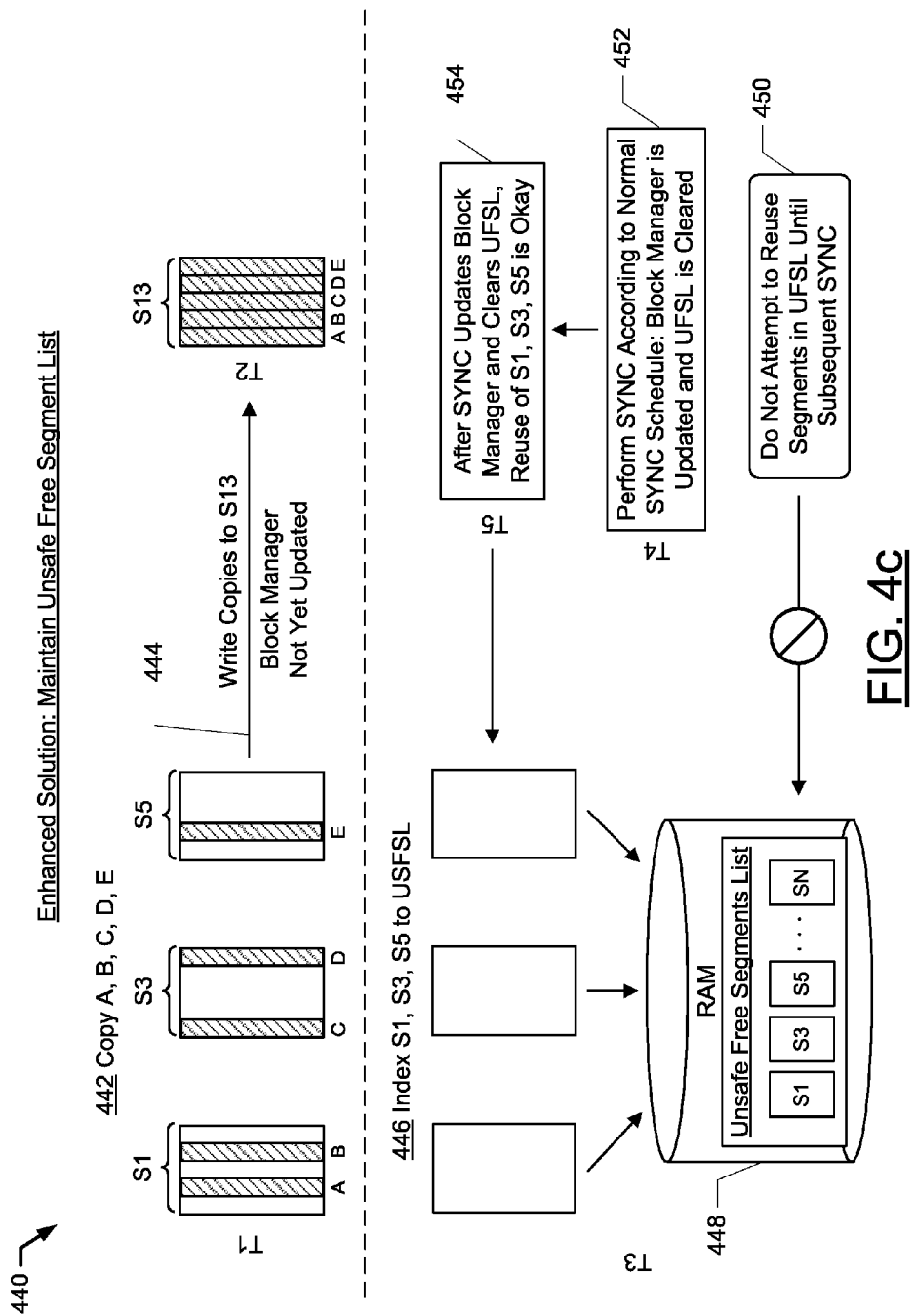
FIG. 4c shows a block diagram depicting an enhanced solution associated with the system crash scenario of FIG. 4a, which prevents data loss during the crash scenario and improves system throughput as compared to the primitive crash recovery scenario of FIG. 4b, in accordance with various implementations described herein.

FIG. 4c shows a diagram depicting an enhanced solution 440 associated with the system crash scenario 400 of FIG. 4a, which prevents data loss during the crash scenario and improves system throughput as compared to the primitive crash recovery scenario 420 of FIG. 4b, in accordance with various embodiments. Following time T0 of the system crash scenario 400 of FIG. 4a, at time T1, page data of blocks A, B, C, D, and E, of storage segments S1, S3, and S5, are copied at operation 442. Then at operation 444 (when the block manager 212 is not yet updated with a corresponding logical to physical address mapping for the page data), the copied page data of blocks A, B, C, D, and E, can be written to storage segment S13, at time T2, such that the page data of blocks A, B, C, D, and E, is consolidated to a single storage segment, S13.

After the write operation 444 to storage segment S13, at time T2, the block manager 212 can be employed (e.g., via the controller 210) to store indications (storage segment identifying information) for storage segments S1, S3, and S5, in the UFSL 448 to prevent these storage segments from being reused, until the block manager 212 has been appropriately updated (with a corresponding logical to physical address mapping for the page data) via a subsequent, periodically scheduled synchronization operation (e.g., a flush track cache operation), as indicated in operation block 450. In this manner, the data blocks, A, B, C, D, and E, of storage segments S1, S3, and S5, are not invalidated by being written to with new page data, i.e., at operation 406 of FIG. 4a.

Accordingly, in the event of an unanticipated system crash event, a system crash recovery procedure can still recover the page data of blocks, A, B, C, D, and E, of storage segments S1, S3, and S5, prior to performing a scheduled synchronization operation (e.g., a flush track cache operation), thereby negating the need for performing the supplemental synchronization operation 426, as described in the primitive crash recovery scenario of FIG. 4b. At time T4, a periodically scheduled synchronization operation can be performed at operation block 452, which will clear the indications of storage segments S1, S3, and S5, from the UFSL, and update the block manager 212 with a corresponding logical to physical address mapping for the page data page data of blocks, A, B, C, D, and E, which is consolidated in the storage blocks of storage segment S13. Thereafter, at time T5, when the UFSL has been cleared, reuse of storage segments S1, S3, and S5 is approved, as indicated in operation block 454.

Figure 5:
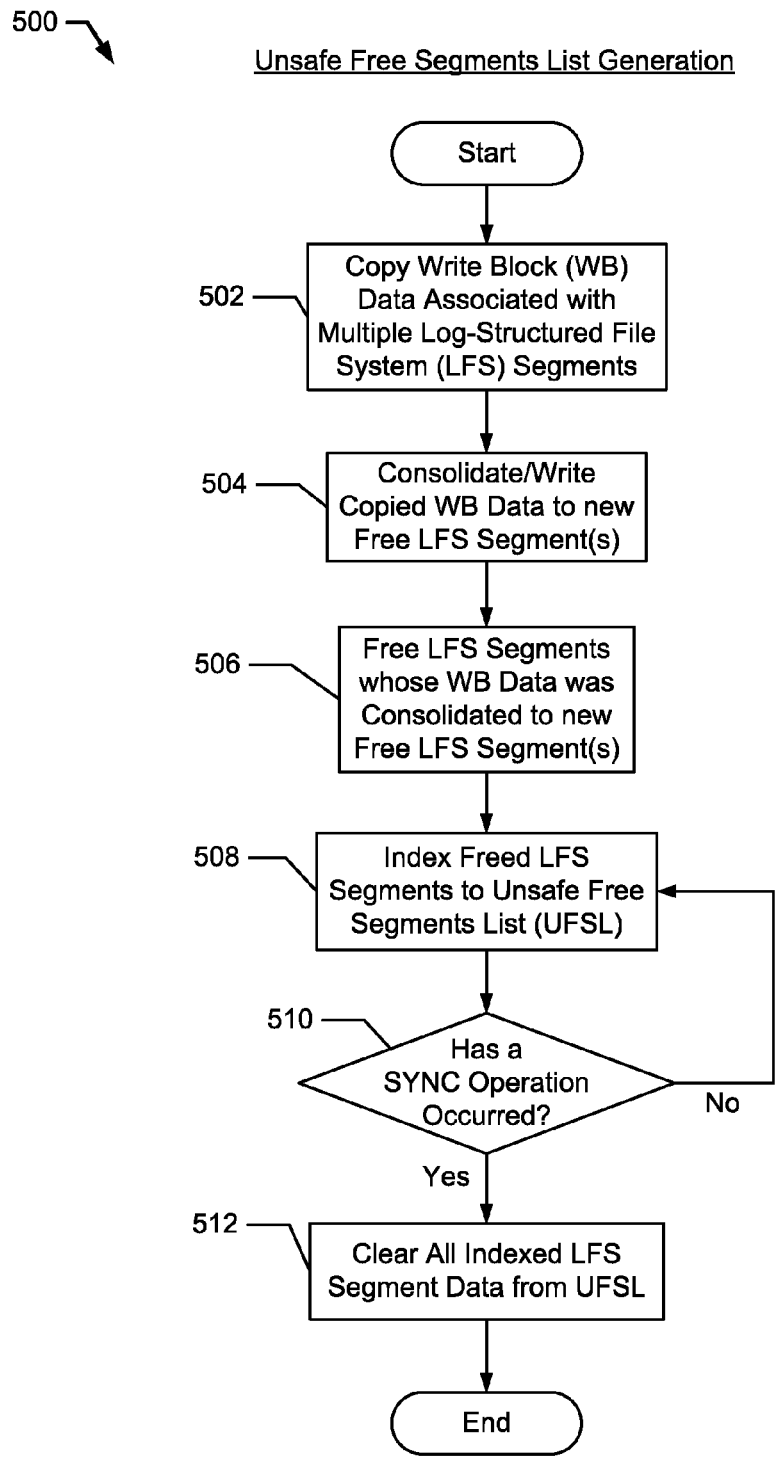
FIG. 5 shows a flowchart depicting an exemplary UFSL generation procedure, in accordance with some embodiments of the disclosure.

FIG. 5 shows a flowchart associated with an exemplary UFSL generation procedure 500, in accordance with some embodiments of the disclosure. In this regard, it should be understood that any or all of the procedures 500 depicted in FIG. 5 may be associated with a method, or methods, that can be implemented by the execution of computer program instructions stored on a non-transitory computer-readable storage medium 208 of apparatus 200. The execution of these program instructions can be performed by the processor(s) 204 of the processing circuitry 202 and/or processors of the controller 210, in accordance with varying embodiments of the disclosure.

Initially, at operation block 502, write block data or page data of multiple storage blocks of one or more storage segments of a LFS may be copied (e.g., as in the manner described above for FIGS. 4a-c). Next at operation block 504, the copied write block data can be consolidated and written to one or more new free LFS storage segments. It should be understood that this consolidation procedure will write page data that is distributed amongst several storage segments to a fewer number of storage segments. Subsequently, at operation block 506, storage segments whose write block data is consolidated to a fewer number of new free storage segments are freed. Then, at operation block 508, the recently freed storage segments are indexed to the UFSL, to identify/flag these storage segments as being unavailable for subsequent write operations for a limited period of time.

At decision block 510, a determination is made as to whether a periodic, scheduled synchronization operation (e.g., a flush track cache operation) has occurred. In a scenario where a scheduled synchronization operation has occurred, at operation block 512, all of the indexed storage segment indications will be cleared from the UFSL. Alternatively, in a scenario where a scheduled synchronization operation has not yet occurred storage segment indications can continue to be indexed to the UFSL at operation block 508.

Figure 6:
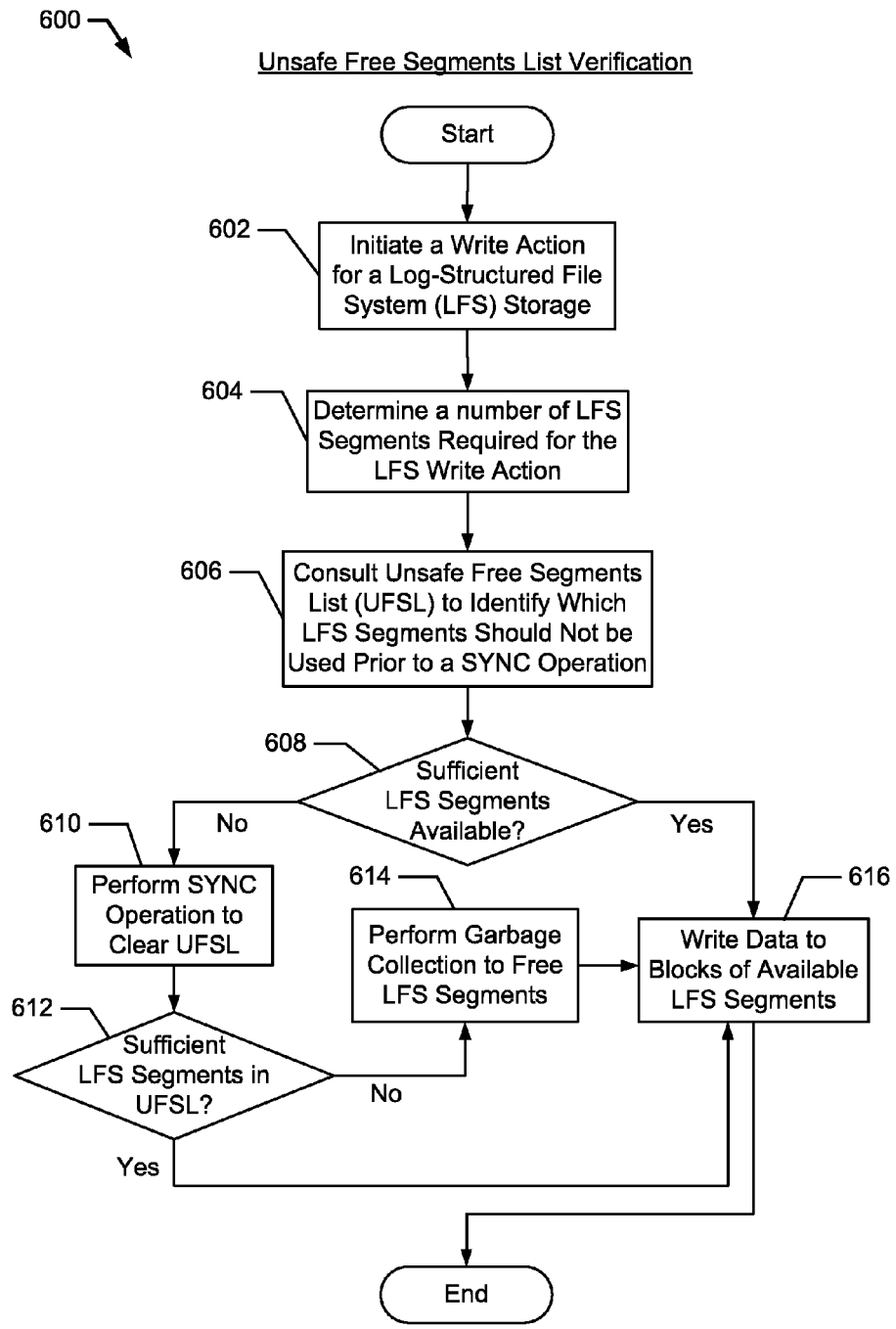
FIG. 6 shows a flowchart depicting an exemplary UFSL verification procedure whereby the UFSL can be employed to improve storage system throughput, in accordance with various implementations.

FIG. 6 shows a flowchart associated with an exemplary UFSL verification procedure 600 whereby the UFSL can be employed to improve storage system throughput, in accordance with various implementations. In this regard, it should be understood that any or all of the procedures 600 depicted in FIG. 6 may be associated with a method, or methods, that can be implemented by the execution of computer program instructions stored on a non-transitory computer-readable storage medium 208 of apparatus 200. The execution of these program instructions can be performed by the processor(s) 204 of the processing circuitry 202 and/or processors of the controller 210, in accordance with varying embodiments of the disclosure.

Initially, at operation block 602, a write operation for page data of a LFS may be initiated. Next, at operation block 604, a determination can be made (e.g., by a block manager 212) as to how many storage segments of a non-volatile storage 228 are required for writing the page data associated with the write operation. After a number of required storage segments for the write operation is determined, the UFSL can be consulted (e.g., by the block manager 212) to identify which storage segments of the non-volatile storage 228 should not be written to, prior to a scheduled synchronization operation (e.g., a flush track cache operation).

Then, at decision block 608, a determination is made as to whether a sufficient number free storage segments of the LFS are available, excluding the storage segments indexed to the UFSL, for writing the page data. In a scenario where it is determined that sufficient storage segments of the LFS, excluding the storage segments indexed to the UFSL, are available for writing the page data, the corresponding page data is written to the available LFS storage segments at operation block 616. Alternatively, in a scenario where it is determined that sufficient storage segments of the LFS, excluding the storage segments indexed to the UFSL, are not available for writing the page data, the process proceeds to operation block 610, where a scheduled sync operation can be performed to clear the UFSL and free a particular number of previously unavailable free segments.

Subsequently, at decision block 612, a determination can again be made as to whether sufficient free storage segments have become available (e.g., by clearing the UFSL) for writing the page data to the LFS. In a scenario where sufficient free segments have become available to accommodate the writing of the page data, at operation block 616, the corresponding page data is written to the available storage segments. However, in a scenario where sufficient free segments have not become available to accommodate the writing of the page data, then at operation block 614, a garbage collection procedure (e.g., similar to that which was described above for FIG. 3) is performed to free additional storage segments of the LFS, sufficient to accommodate the writing of the page data. Thereafter, at operation block 616, the corresponding page data is written to the available storage segments.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method of managing storage resources for a log-structured file system (LFS), the method comprising:
   copying write block data from a plurality of used segments of the LFS;
   writing the copied write block data to one or more free segments of the LFS;
   indexing an unsafe free segments list (UFSL) with indications of the plurality of used segments after copying the write block data; and
   preventing reuse of the plurality of used segments while the indications of the plurality of used segments are indexed in the UFSL.

2. The method of claim 1, further comprising:
   in response to performing a scheduled synchronization operation, clearing the indications of the plurality of used segments from the UFSL; and
   reusing at least one of the plurality of used segments that was previously indexed to the UFSL.

3. The method of claim 2, wherein:
   the LFS is a flash storage system; and
   the scheduled synchronization operation is a flush track cache operation that is scheduled to occur on a periodic basis to update a block manager of the flash storage system with current storage location information.

4. The method of claim 2, wherein reusing the at least one of the plurality of used segments which was previously indexed to the UFSL comprises:
   writing new write block data to the at least one of the plurality of used segments which was previously indexed to the UFSL; and
   updating a block manager with a storage location for the new write block data.

5. The method of claim 2, wherein performing the scheduled synchronization operation comprises mapping one or more logical storage addresses associated with the copied write block data to one or more physical storage addresses where the copied write block data is stored after writing the copied write block data to the one or more free segments of the LFS.

6. The method of claim 1, further comprising:
   receiving new write block data after indexing the UFSL; and
   in response to receiving the new write block data, consulting the UFSL to determine which segments of the LFS are indexed in the UFSL as unavailable segments.

7. The method of claim 6, further comprising:
   identifying one or more free segments of the LFS that are not indexed in the UFSL as unavailable segments; and
   writing the received new write block data to the identified one or more free segments of the LFS.

8. A method of writing page data in a non-overwrite storage system, the method comprising:
   determining a number of required segments for writing the page data in the non-overwrite storage system;
   consulting an unsafe free segments list (UFSL) to identify which free segments of the non-overwrite storage system should not be written to;
   determining whether sufficient free segments are available for writing the page data in the non-overwrite storage system; and
   in response to determining that sufficient free segments are available, writing the page data to data blocks of one or more free segments of the non-overwrite storage system.

9. The method of claim 8, wherein determining whether sufficient free segments are available, further comprises:
   comparing the number of required segments for writing the page data in the non-overwrite storage system to a number of available free segments in the non-overwrite storage system, excluding free segments identified in the UFSL; and
   determining whether the number of free segments in the non-overwrite storage system, excluding free segments identified in the UFSL, is equal to or exceeds the number of required segments for writing the page data in the non-overwrite storage system.

10. The method of claim 8, further comprising:
    in response to determining that sufficient free segments are not available for writing the page data in the non-overwrite storage system, performing a synchronization operation to clear the UFSL; and
    determining whether sufficient free segments are available for writing the page data in the non-overwrite storage system after performing the synchronization operation.

11. The method of claim 10, wherein:
    the non-overwrite storage system is a flash storage system; and
    the synchronization operation is a flush track cache operation that is scheduled to occur on a periodic basis to update a block manager of the flash storage system with current storage location information.

12. The method of claim 10, wherein in response to performing the synchronization operation and determining that sufficient free segments are available for writing the page data in the non-overwrite storage system, writing the page data to data blocks of one or more free segments of the non-overwrite storage system.

13. The method of claim 10, further comprising:
in response to performing the synchronization operation and determining that sufficient free segments are available for writing the page data in the non-overwrite storage system,
writing the page data to data blocks of one or more free segments which was previously identified in the UFSL.

14. The method of claim 10, further comprising:
in response to performing the synchronization operation and determining that sufficient free segments are not available for writing the page data in the non-overwrite storage system, performing a garbage collection operation to free up one or more segments of the non-overwrite storage system;
determining whether sufficient free segments are available for writing the page data in the non-overwrite storage system after performing the garbage collection operation; and
in response to performing the garbage collection operation and determining that sufficient free segments are available for writing the page data in the non-overwrite storage system, writing the page data to data blocks of one or more free segments of the non-overwrite storage system.

15. A non-overwrite storage system comprising:
a non-volatile storage component having a plurality of storage segments;
a volatile storage component having an unsafe free segments list (UFSL); and
a controller coupled to the non-volatile storage component and to the volatile storage component, wherein the controller is configured to:
copy page data from one or more used segments of the plurality of storage segments;
write the copied page data to one or more free segments of the plurality of storage segments;
index the UFSL with indications of the one or more used segments after copying the page data; and
prevent reuse of the one or more used segments while the indications of the one or more used segments are indexed in the UFSL.

16. The non-overwrite storage system of claim 15, wherein the controller is further configured to:
perform a synchronization operation that clears the indications of the one or more used segments from the UFSL; and
reuse at least one of the one or more used segments that was previously indexed to the UFSL.

17. The non-overwrite storage system of claim 16, wherein:
the non-overwrite storage system is a flash storage system; and
the synchronization operation is a flush track cache operation that is scheduled to occur on a periodic basis to update a block manager of the flash storage system with current storage location information.

18. The non-overwrite storage system of claim 16, wherein, as part of the reuse, the controller is configured to:
write new page data to the at least one of the one or more used segments which was previously indexed to the UFSL; and
update a block manager with a storage location for the new page data.

19. The non-overwrite storage system of claim 15, wherein the controller is further configured to:
receive new page data after indexing the UFSL; and
in response to receiving the new page data, consult the UFSL to determine which segments of the non-overwrite storage system are indexed in the UFSL as unavailable segments.

20. The non-overwrite storage system of claim 19, wherein the controller is further configured to:
identify one or more free segments of the non-overwrite storage system that are not indexed in the UFSL as unavailable segments; and
write the received new page data to the identified one or more free segments of the non-overwrite storage system.

* * * * *